May 10, 1955     C. W. J. HEDBERG ET AL     2,708,008
MECHANICAL AND ELECTROSTATIC GAS CLEANING MECHANISM
Filed Aug. 12, 1953     5 Sheets-Sheet 1

INVENTORS
CARL W.J. HEDBERG,
DAVID A. TRIPP,
HARRY A. WINTERMUTE.

BY *Harold T. Stowell*

ATTORNEY

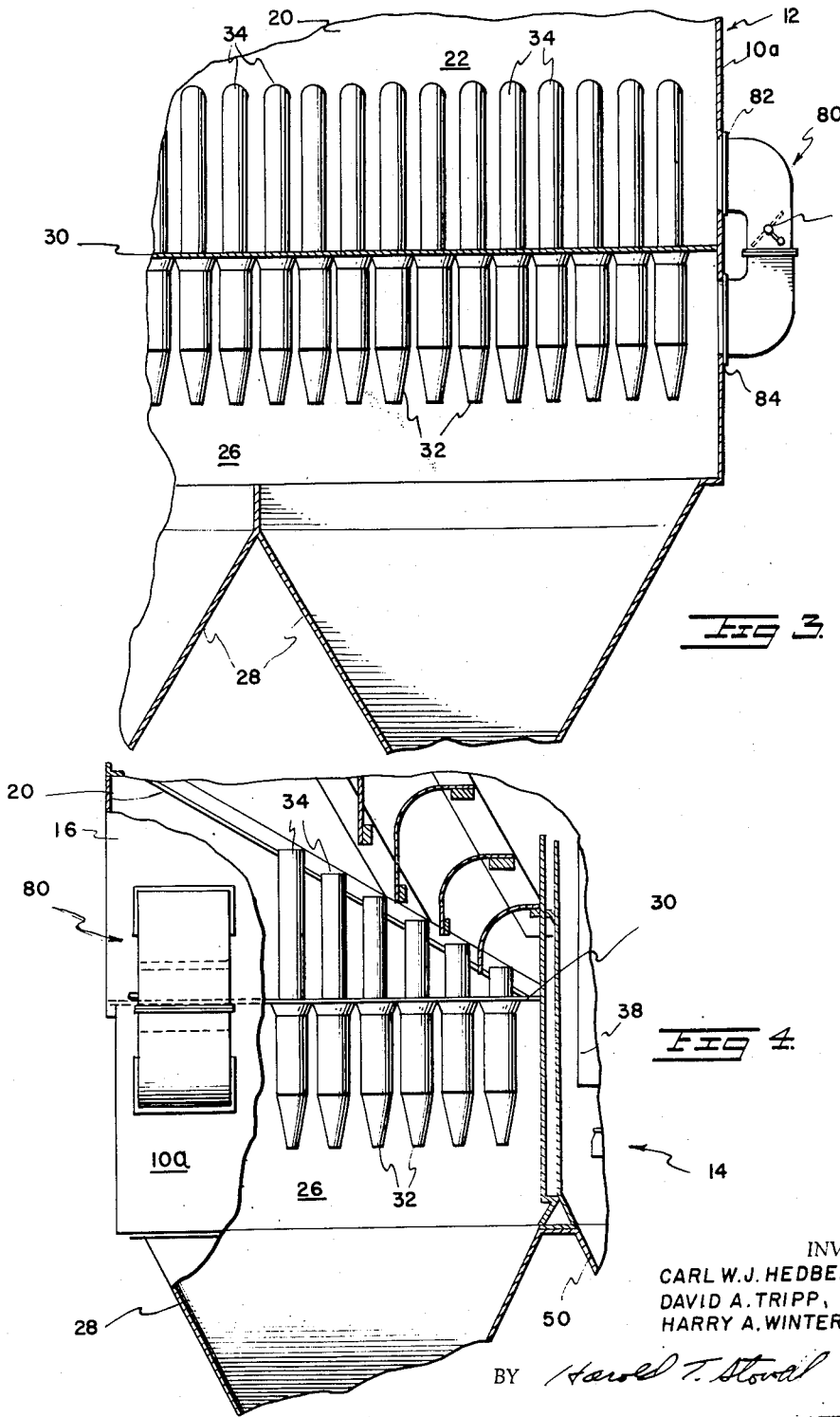

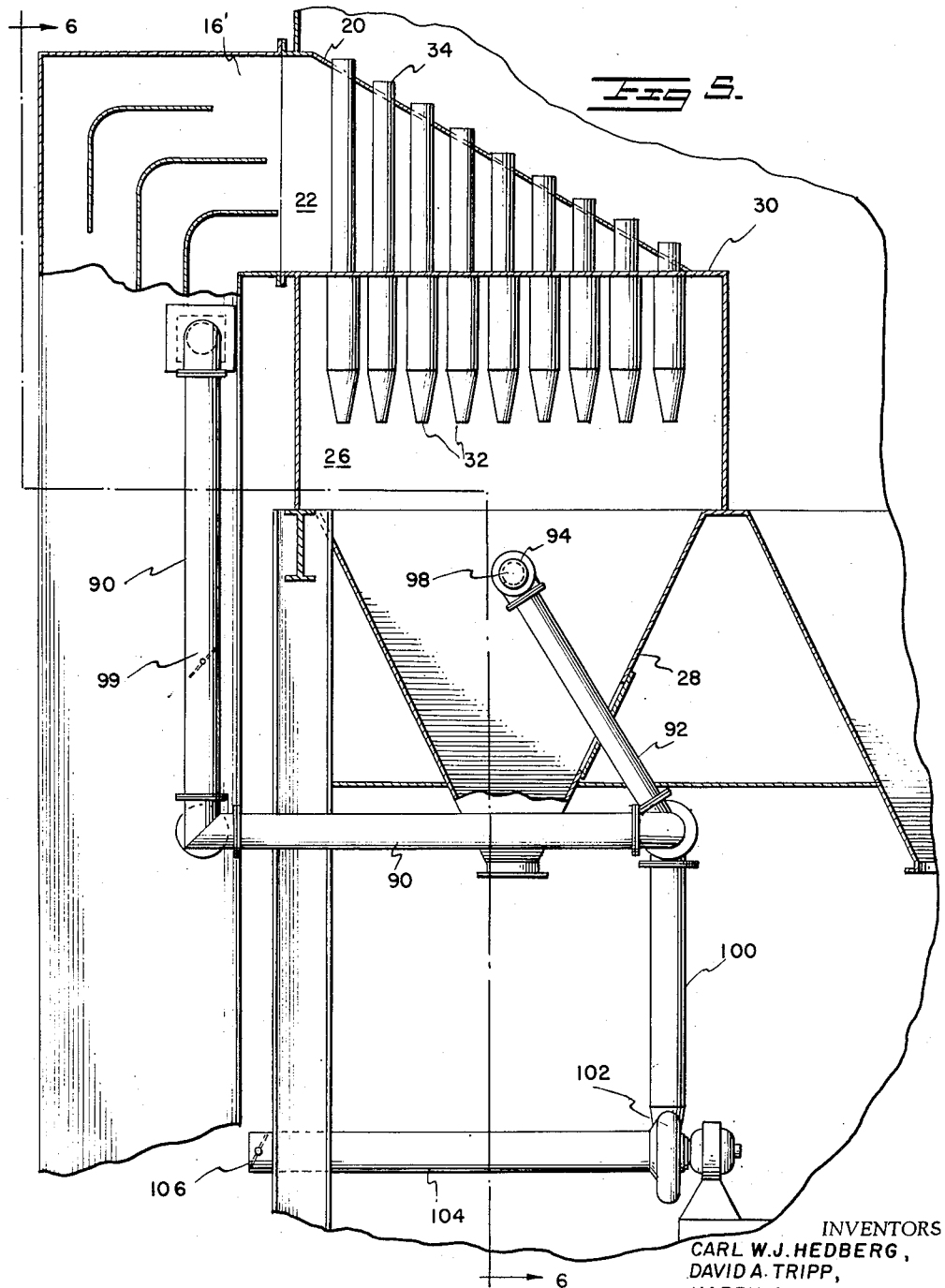

United States Patent Office 2,708,008
Patented May 10, 1955

2,708,008

MECHANICAL AND ELECTROSTATIC GAS CLEANING MECHANISM

Carl W. J. Hedberg, Bound Brook, and David A. Tripp and Harry A. Wintermute, Plainfield, N. J., assignors to Research Corporation, New York, N. Y., a corporation of New York Application August 12, 1953, Serial No. 373,788

7 Claims. (Cl. 183—7)

This invention relates to an improvement in combination electrostatic and mechanical gas cleaning mechanisms and in particular to means for supplying controlled quantities of gas to the chamber below the tangential inlet or vanes of cyclone type mechanical collectors, when employed in combination electrostatic precipitation apparatus.

It has been found that by supplying controlled amounts of air or gas to the chamber below the tangential inlets or vanes of cyclone type mechanical collectors substantial control of the collection efficiency of the mechanical separators may be achieved whereby the amount of suspended material in the gas stream passing to the electrostatic precipitator may be regulated; a portion of the coarser fraction of suspended material may be passed to the electrostatic precipitator; and accumulations of dust in the hoppers of the mechanical collectors and plugging of the cyclone tubes during a failure of the dust removal system may be prevented. The invention also helps to reduce power requirements of the induced draft fan when dust concentration in the gas stream to be cleaned is so low that at least the mechanical cleaning can be dispensed with.

These and other objects and advantages of the invention are provided by a dust collecting device including an electrostatic precipitation unit, a mechanical collector, means for passing gas to be cleaned serially through said precipitator and mechanical collector, wherein the mechanical collector comprises a casing having an inlet port and an outlet port, a first tube sheet separating said ports one from the other, a second tube sheet positioned below said first tube sheet and forming a gas inlet chamber therewith, a plurality of separator tubes extending through and depending from the second tube sheet, outlet tubes extending through said first tube sheet and projecting into each of the separator tubes, gas spinning means at the upper ends of the separator tubes, and means for directing a stream of gas into the space below said second tube sheet without passing through said gas spinning means.

The invention will be described in greater detail with reference to a combination mechanical and electrostatic gas cleaning mechanism wherein the mechanical collector is positioned at the upstream end of the electrostatic section; however, it will be apparent that substantial advantages of the invention will also be obtained where the mechanical collector is positioned on the down stream side of the electrostatic precipitator.

In the drawings:

Fig. 3 is a fragmentary end view in partial section of a modified form of the present invention;

Fig. 4 is a side elevation in partial section of the structure shown in Fig. 3 of the drawings;

Fig. 5 is a fragmentary side elevation in partial section of still another form of the present invention.

Figure 1:
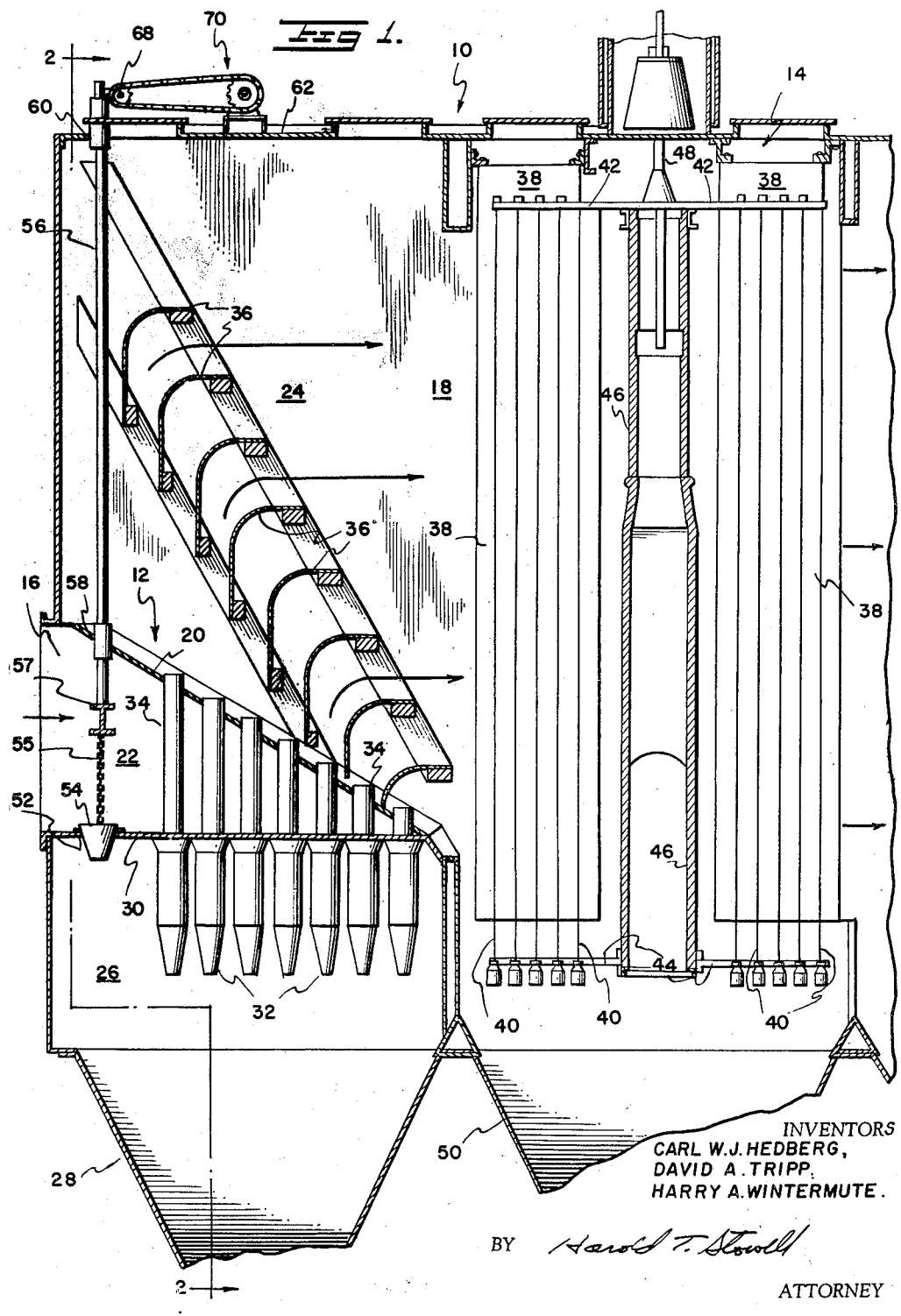
Fig. 1 is a fragmentary vertical sectional view of one form of the improved mechanical and electrostatic gas cleaning mechanism.
Figure 2:
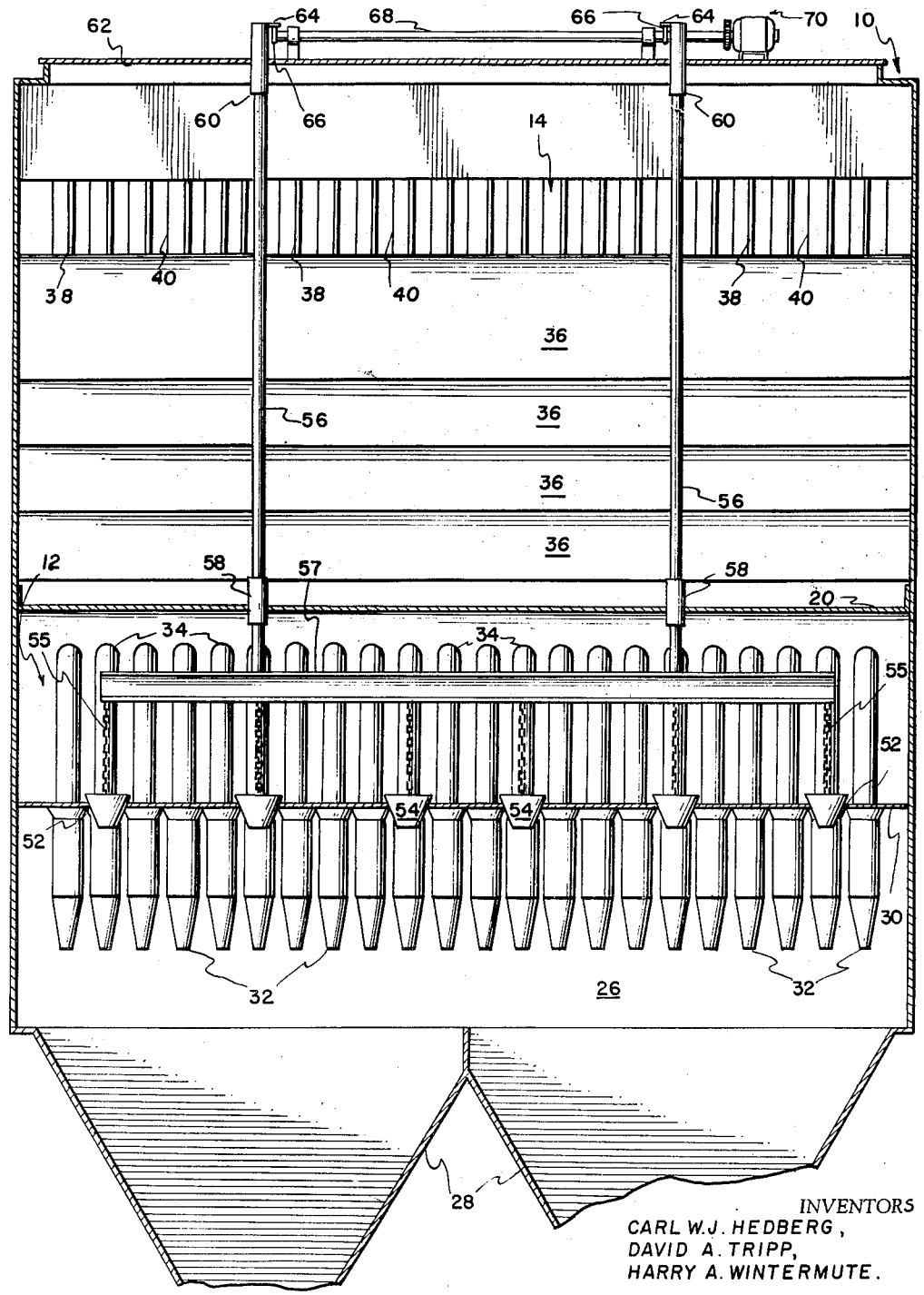
Fig. 2 is a section on line 2—2 of Fig. 1.

With reference to Figs. 1 and 2 of the drawings, 10 is the outer shell or casing of the mechanical electrostatic gas cleaning mechanism. Within the casing is housed a cyclone type dust separation unit generally designated 12 and an electrostatic gas separation unit generally designated 14.

The mechanical separation unit generally comprises a dirty gas inlet 16, and a gas outlet 18. The gas inlet and outlet are separated one from the other by an inclined header sheet 20 which divides this section of the housing into an inlet chamber 22, communicating with the inlet 16, and an outlet chamber 24 which communicates with the outlet 18 and the inlet to the electrostatic separator to be hereinafter described.

A second and horizontal header plate 30 forms a wall separating the inlet chamber 22 from the dust collecting chamber 26, the lower end of which forms the dust storage hoppers 28. The header plate 30 supports a plurality of collecting tubes 32. Each of the tubes 32 extends downwardly from the plate 30 and terminates above the dust hoppers 28.

The inclined header plate 20 supports the upper ends of discharge tubes 34. Each tube 34 projects through the plate 20, extends vertically downward and projects into one of the collecting tubes 32 with which it is axially aligned in concentric relationship.

At the upper end of each collecting tube and between its inside wall and the outside wall of the corresponding outlet tube is provided a gas spinning vane as well known in the art. It will be apparent to those skilled in the art that other forms of gas spinning means such as tangential inlets could be employed in the cyclone type separators shown in the drawings.

Positioned in the outlet chamber 24 are a plurality of gas turning baffles 36 which aid in the even distribution of the discharge gas to the electrostatic unit 14.

The gases leaving outlet chamber 24, as shown by the arrows, pass through outlet 18 into the electrostatic precipitation unit 14 which generally comprises complementary collecting plate electrodes 38 and fine wire discharge electrodes 40. The two banks of discharge electrodes are supported at their upper ends by frame work 42 and at their lower ends by spacing frames 44; the two frames 42 and 44 are both supported by insulated column 46 and the high tension bus bar 48, there being in the preferred form of the invention two spaced columns and bus bars. The collecting plate electrodes are supported at their upper ends from the shell or frame 10. At the lower ends of the complementary electrodes there are provided dust hoppers 50, only one of which is shown in the drawings.

The gas after passing through the electrostatic unit 14 may be passed through additional electrostatic units, discharged into the atmosphere or employed for industrial purposes.

In order to supply a portion of the gas stream to be cleaned to the chamber 26 below header plate 30, a plurality of openings 52 are provided in the header plate 30. These openings permit a flow of gas from the inlet chamber 22 to the chamber 26 and thence to the chamber 24 by passing up through pipes 32 and 34 without passing through the gas spinning means.

Each of the openings 52 is provided with a gas flow control means which as shown in the drawings by way of illustration are plugs 54 which sit in the openings in the header plate 30.

Each plug as more clearly shown in Fig. 2 of the drawings is suspended by a chain 55 from an I beam 57 which extends across the chamber 22.

Welded to the upper surface of the I beam are two shafts 56 which are journalled for sliding movement in bushings 58 carried by the header plate 20 and bushings 60 secured to the top 62 of the casing 10.

Welded to the upper end of each shaft 56 is a boss 64. Each boss is engaged by a cam arm 66 secured to a horizontal shaft 68. The shaft 68 is designed to be rotated by means of motor and belt arrangement generally designated 70.

To open the passages 52 from their closed position as shown in the drawings the motor rotates shaft 68 and cam arms 66. The cam arms engage bosses 64 and lift the plug valves 54 through shafts 56, I beam 57 and chains 55. The rotation of the shaft 68 is continued until the passages 52 are opened to the desired degree or to the maximum travel afforded by the cam arms 66.

With the passages 52 open, a portion of the gas stream entering the chamber 22 passes through the openings 52 into the chamber 26 up through the separator tubes 32 and outlet tubes 34 to the chamber 24 and thence to the electrostatic precipitator. The remainder of the gases follow their normal passage through the cyclone type collectors.

A modified form of bypass means for the mechanical gas cleaning mechanism is shown in Figs. 3 and 4 of the drawings.

In Figs. 3 and 4 only a portion of the mechanical cleaner is shown. However, it will be understood that following the mechanical section there is an electrostatic gas cleaning section similar to that shown in Figs. 1 and 2, a small portion of which can be seen in the right hand section of Fig. 4.

Identical reference numerals are assigned to corresponding structures in Figs. 1 and 2, and 3 and 4.

The cyclone type dust separator 12 is positioned within the casing 10 along with an electrostatic separation unit generally designated 14.

The mechanical separation unit generally comprises a dirty gas inlet 16, and a gas outlet 18. The gas inlet and outlet are separated one from the other by an inclined header sheet 20 which divides this section of the housing into an inlet chamber 22, communicating with the inlet 16, and an outlet chamber 24, which communicates with the outlet 18 and the inlet to the electrostatic separator.

A second and horizontal header plate 30 forms a wall separating the inlet chamber 22 from the dust collecting chamber 26, the lower end of which forms the dust storage hoppers 28.

The header plate 30 supports a plurality of collecting tubes 32. Each of the tubes 32 extends downwardly from the plate 30 and terminates above the dust hopper 28.

The inclined header plate 20 supports the upper ends of discharge tubes 34. Each tube 34 projects through the plate 20, extends vertically downward and projects into one of the collecting tubes 32 with which it is axially aligned in concentric relationship.

At the upper end of each collecting tube and between its inside wall and the outside wall of the corresponding outlet tube is provided a gas spinning means not shown in the drawings.

The gases leaving the outlet chamber 24, pass through outlet 18 into the electrostatic precipitation unit.

In order to supply a portion of the gas stream to be cleaned to the chamber 26 below header plate 30 a substantially U-shaped duct or conduit 80 connects the chambers 22 and 26, the upper end 82 of duct 80 being connected to the side 10a of the casing 10 between header plates 20 and 30 and the lower end 84 being connected to the side 10a below header plate 30.

Within the duct 80 is provided a gas control damper 86 to regulate the amount of gas flow between the two chambers which bypasses the gas spinning vanes of the mechanical collectors.

While only one duct connecting the inlet chamber 22 with the chamber 26 is shown it is evident that a plurality of such ducts may be employed where it is found a single duct does not have the necessary capacity or where it is necessary to provide more even gas distribution.

In a test of the invention made on a full scale precipitator installation cleaning power plant boiler gas at 300° F., it has been found that by providing a bypass between the chambers corresponding to chambers 22 and 26 of Figs. 1–2 of the drawings, the pressure drop between the chambers was reduced by 50% and the removal of suspended particles in the cyclone tubes was reduced to 28% of removal with the bypass closed.

Figure 6:
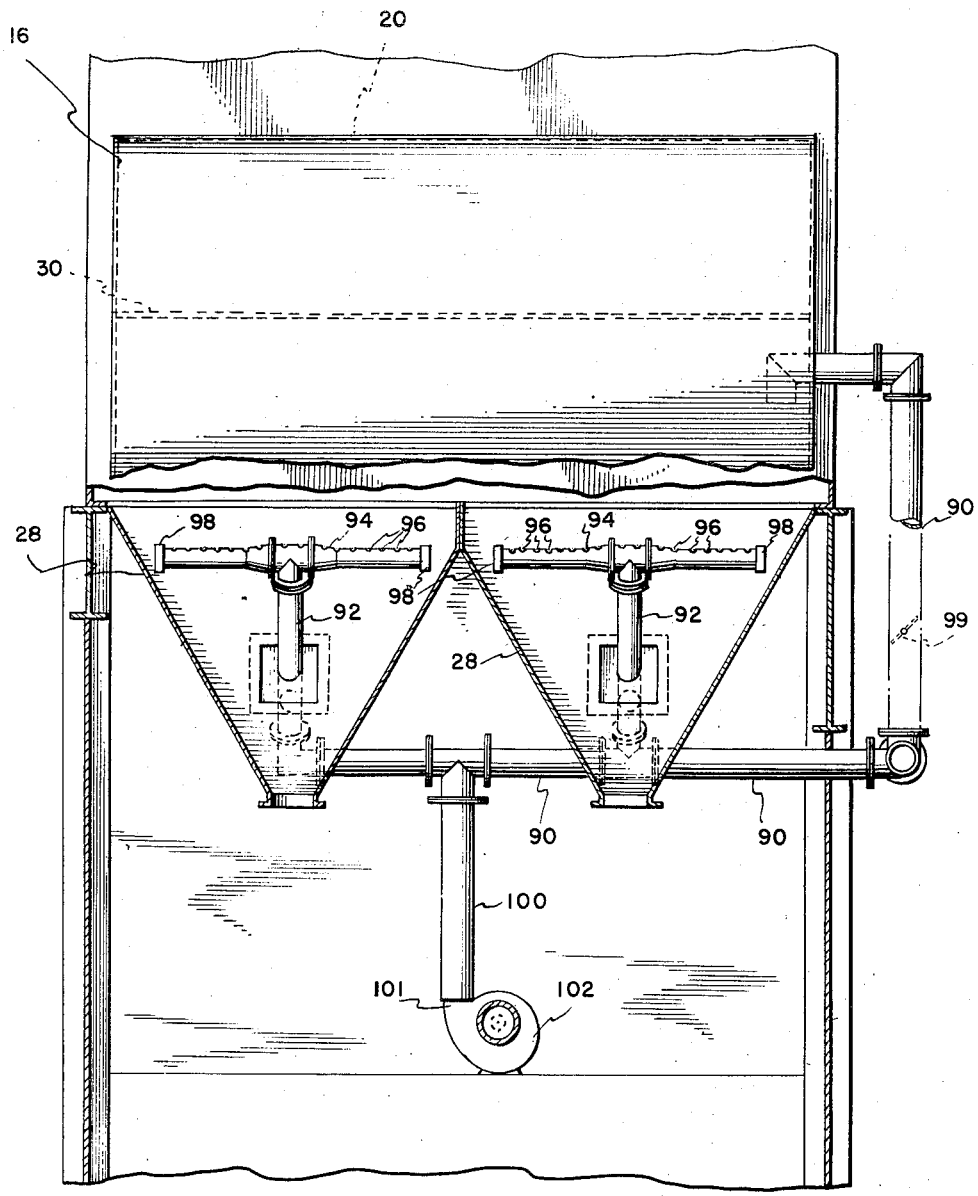
Fig. 6 is a section on line 6—6 of Fig. 5.

Figs. 5 and 6 show a further modification of the present invention wherein the gases directed into the chamber above the mechanical dust collecting hopper may be a portion of the gases to be cleaned or from an independent source and wherein the gas may be supplied under pressure.

In Figs. 5 and 6 the electrostatic precipitation unit is not shown and the details of the mechanical separator are in general identical with the form shown in Figs. 1–4 and provided with identical reference numerals.

The mechanical separation unit generally comprises a dirty gas inlet 16', and a gas outlet 18. The gas inlet and outlet are separated one from the other by an inclined header sheet 20 which divides this section of the housing into an inlet chamber 22, communicating with the inlet 16', and an outlet chamber 24 which communicates with the outlet 18 and the inlet to the electrostatic separator.

A second and horizontal header plate 30 forms a wall separating the inlet chamber 22 from the dust collecting chamber 26, the lower end of which forms the dust storage hoppers 28.

The header plate 30 supports a plurality of collecting tubes 32. Each of the tubes 32 extends downwardly from the plate 30 and terminates above the dust hopper 28.

The inclined header plate 20 supports the upper ends of discharge tubes 34. Each tube 34 projects through the plate 20, extends vertically downward and projects into one of the collecting tubes 32 with which it is axially aligned in concentric relationship.

At the upper end of each collecting tube and between its inside wall and the outside wall of the corresponding outlet tube is provided a gas spinning means not shown in the drawings.

The gases leaving the outlet tubes pass to an electrostatic precipitation unit as hereinbefore described with reference to Figs. 1 and 2.

To reduce the pressure drop between chambers 22 and 26 a conduit 90 which is connected at one end to inlet flue 16' is connected to two off-take ducts 92, one of which is provided in each of the hoppers 28. Each of the ducts 92 connects to a distribution duct 94 extending across its corresponding hopper just below the open ends of the separator tubes 32. Each distribution duct 94 has a plurality of gas discharge orifices 96 provided in its upper surface, and the ends of the discharge ducts are closed by nipples or caps 98.

The distribution ducts 94 aid in equalizing the upflow of gases through the plurality of cyclone tubes 32.

A damper 99 is positioned across conduit 90 to control the flow of gases from the inlet duct 16' to distribution ducts 94.

A conduit 100 is connected at one end to the conduit 90 between the ducts 92 and is connected at the other end to the discharge outlet 101 of the blower 102. The intake port of the blower is connected to a duct 104 which opens to the atmosphere. A damper 106 is positioned at the inlet end of the duct 104.

When it is desired to lower the efficiency of the mechanical collector units without bypassing any of the dirty gases around the gas spinning vanes the damper 99 is closed, damper 106 is opened, and the blower 102 actuated. Under these conditions clean air is discharged from the distribution ducts 94 into the chamber below the open ends of the separator tubes. The air being blown into this chamber increases the pressure therein and lowers the pressure drop between chambers 22 and 26 which has the effect of lowering the collecting efficiency of the units. It has also been found that as the gases from the distribution ducts 94 pass upwardly through chamber 26 and through the separator tubes 32, a portion of the collected particulate material is resuspended in the gas stream to thus increase the percentage of solid material passing to the electrical precipitator.

From the foregoing description it will be seen that the present device fully accomplishes the aims, objects, and advantages of the invention. It will be evident that various modifications may be made in the form of the invention shown in the drawings by way of illustration. For example, the dampers provided in the gas bypass conduits or the motor controlling the valves 54 or the blower 102 may be provided with automatic controls to provide a constant, preselected pressure differential between the chambers 22 and 26. It will be further evident that while in the preferred form of the invention the mechanical collectors are on the upstream side of the electrostatic separator, the mechanical collectors may be positioned on the downstream side of the electrostatic unit and still provide substantial and useful benefits.

We claim:

1. In a dust collecting device including an electrostatic precipitator unit, a mechanical collector, means for passing gas to be cleaned serially through said mechanical collector and precipitator, wherein the mechanical collector comprises a casing having an inlet port and an outlet port, a first tube sheet separating said ports one from the other, a second tube sheet positioned below said first tube sheet and forming a gas inlet chamber therewith, a plurality of separator tubes extending through and depending from the second tube sheet, outlet tubes extending through said first tube sheet and projecting into each of the separator tubes, gas spinning means at the upper ends of the separator tubes, and means for directing a stream of gas into the space below said second tube sheet and in communication with the lower ends of the separator tubes without passing through said gas spinning means.

2. In a dust collector as defined in claim 1 wherein the means for directing a stream of gas into the space below said second tube sheet comprises a plurality of valves provided in orifices in said second tube sheet, and control means for actuating said valves.

3. In a dust collector as defined in claim 1 wherein the means for directing a stream of gas to the space below said second tube sheet comprises a duct, one end of said duct opening into the inlet chamber between said first and second tube sheets and the other end of said duct opening into the casing below said second tube sheet.

4. A dust collector as defined in claim 3 including valve means in said duct controlling the flow of gas therethrough.

5. In a dust collector as defined in claim 1 wherein the means for directing a stream of gas into the space below said second tube sheet comprises a gas distributing duct having a plurality of gas outlet orifices positioned below the separator tubes, first conduit means connecting said gas distribution duct and said gas inlet port, and a second conduit means connecting said gas distribution duct with the atmosphere.

6. A dust collector as defined in claim 5 including valve means in said first conduit means and a blower and valve means in said second conduit means.

7. In a dust collecting device including an electrostatic precipitator unit, a mechanical collector, and means for passing gas to be cleaned serially through said mechanical collector and precipitator wherein the mechanical collector comprises a casing having an inlet port and an outlet port, a first tube sheet having a plurality of openings therein separating said ports one from the other, a second tube sheet having a plurality of openings therein positioned below said first tube sheet and forming a gas inlet chamber therewith, separator tubes extending downwardly from some of the openings in the second tube sheet, outlet tubes extending through the openings in said first tube sheet and projecting into each of the separator tubes, gas spinning means at the upper ends of the separator tubes, closure members for the other of the openings in said second tube sheet, a bar movably supported over said closure members, chains connecting the bar and said closure members, and means of raising and lowering the bar.

References Cited in the file of this patent

UNITED STATES PATENTS

| | | |
|---|---|---|
| 1,997,125 | Soyez et al. | Apr. 9, 1935 |
| 2,399,509 | Rich | Apr. 30, 1946 |